United States Patent
Kim et al.

(10) Patent No.: US 12,362,355 B2
(45) Date of Patent: Jul. 15, 2025

(54) CATHODE ACTIVE MATERIAL FOR LITHIUM SECONDARY BATTERY AND LITHIUM SECONDARY BATTERY INCLUDING THE SAME

(71) Applicant: SK On Co., Ltd., Seoul (KR)

(72) Inventors: Sang Bok Kim, Daejeon (KR); Tae Kyoung Lee, Daejeon (KR); Mi Jung Noh, Daejeon (KR); Ji Hoon Choi, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 694 days.

(21) Appl. No.: 17/569,861

(22) Filed: Jan. 6, 2022

(65) Prior Publication Data
US 2022/0216469 A1    Jul. 7, 2022

(30) Foreign Application Priority Data
Jan. 7, 2021    (KR) .................. 10-2021-0002119

(51) Int. Cl.
*H01M 4/525*    (2010.01)
*C01G 53/50*    (2025.01)
(Continued)

(52) U.S. Cl.
CPC ............ *H01M 4/525* (2013.01); *C01G 53/50* (2013.01); *C01G 53/82* (2025.01);
(Continued)

(58) Field of Classification Search
CPC ...... H01M 4/525; H01M 4/131; H01M 4/366; H01M 4/505; H01M 10/052;
(Continued)

(56) References Cited

U.S. PATENT DOCUMENTS

| | | | |
|---|---|---|---|
| 5,180,574 A * | 1/1993 | Von Sacken | H01M 4/505 423/644 |
| 2017/0155133 A1* | 6/2017 | Lee | H01M 4/62 |
| 2018/0026268 A1* | 1/2018 | Kim | C01G 53/006 429/223 |
| 2019/0165360 A1 | 5/2019 | Saruwatari et al. | |

(Continued)

FOREIGN PATENT DOCUMENTS

CN    101359736 A    2/2009
CN    103247797 A    8/2013
(Continued)

OTHER PUBLICATIONS

You et al., "H3BO3 washed LiNi0.8Co0.1Mn0.1O2 with enhanced electrochemical performance and storage characteristics", Journal of Power Sources, 2021, pp. 1-9, vol. 482, No. 228940.

*Primary Examiner* — Maria Laios
*Assistant Examiner* — Lawrence La Raia, III
(74) *Attorney, Agent, or Firm* — The Webb Law Firm (57) ABSTRACT

A cathode active material for a lithium secondary battery is provided. According to embodiments of the present invention, the cathode active material includes a lithium-transition metal composite oxide particle including a plurality of primary particles. The lithium-transition metal composite oxide particle has a lithium-boron-containing portion formed between the primary particles. Thereby, it is possible to improve life-span properties and capacity properties by removing residual lithium.

14 Claims, 7 Drawing Sheets

(51) Int. Cl.
*C01G 53/82* (2025.01)
*H01M 4/02* (2006.01)
*H01M 4/04* (2006.01)
*H01M 4/131* (2010.01)
*H01M 4/36* (2006.01)
*H01M 4/505* (2010.01)
*H01M 10/052* (2010.01)
*H01M 10/0525* (2010.01)

(52) U.S. Cl.
CPC ......... *H01M 4/0416* (2013.01); *H01M 4/131* (2013.01); *H01M 4/366* (2013.01); *H01M 4/505* (2013.01); *H01M 10/052* (2013.01); *H01M 10/0525* (2013.01); *C01P 2004/80* (2013.01); *H01M 2004/028* (2013.01); *Y02E 60/10* (2013.01)

(58) Field of Classification Search
CPC ........ H01M 10/0525; H01M 2004/028; C01G 53/006; C01G 53/50; C01P 2004/80; Y02E 60/10
See application file for complete search history.

(56) References Cited

U.S. PATENT DOCUMENTS

| | | | |
|---|---|---|---|
| 2019/0334170 A1* | 10/2019 | Takamori | H01M 4/463 |
| 2020/0185709 A1* | 6/2020 | Zhou | H01M 4/62 |
| 2020/0266441 A1 | 8/2020 | Yoshihara et al. | |
| 2021/0074996 A1 | 3/2021 | Kim et al. | |
| 2022/0246911 A1 | 8/2022 | Goshima et al. | |

FOREIGN PATENT DOCUMENTS

| | | | |
|---|---|---|---|
| CN | 109155412 A | 1/2019 |
| CN | 112186156 A | 1/2021 |
| JP | 2019220250 A | 12/2019 |
| JP | 2020172420 A | 10/2020 |
| JP | 2020172425 A | 10/2020 |
| JP | 2020172426 A | 10/2022 |
| KR | 100821523 B1 | 4/2008 |
| KR | 1020180090211 A | 8/2018 |
| KR | 1020190044445 A | 4/2019 |
| KR | 1020190095927 A | 8/2019 |
| WO | 2018143734 A1 | 8/2018 |
| WO | 2020230424 A1 | 11/2020 |

* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0002119 filed Jan. 7, 2021, the disclosure of which is hereby incorporated by reference in its entirety.

BACKGROUND OF THE INVENTION

1. Field of the Invention

The present invention relates to a cathode active material for a lithium secondary battery and a method of manufacturing the same, and more particularly, to a lithium metal oxide-based cathode active material for a lithium secondary battery and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight, such that development thereof has been proceeded in this regard.

The lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

As an active material for a cathode of a lithium secondary battery, a lithium-transition metal composite oxide may be used. Examples of the lithium-transition metal composite oxide may include a nickel-based lithium metal oxide.

A lithium secondary battery having longer life-span, high capacity, and operational stability is required as the application range thereof is expanded. In the lithium-transition metal composite oxide used as the active material for a cathode, when non-uniformity in the chemical structure is caused due to precipitation of lithium, etc., it may be difficult to implement a lithium secondary battery having desired capacity and life-span. In addition, when a deformation or damage of the lithium-transition metal composite oxide structure is caused during repeated charging and discharging, life-span stability and capacity maintenance properties may be reduced.

For example, Korean Patent Registration Publication No. 10-0821523 discloses a method of removing lithium salt impurities by washing a lithium-transition metal composite oxide with water, but there is a limitation in sufficient removal of the impurities, and a damage to the surface of particles may be caused in a water washing process.

PRIOR ART DOCUMENT

Patent Document (Patent Document) Korean Patent Registration Publication No. 10-0821523

SUMMARY OF THE INVENTION

It is an object of the present invention to provide a cathode active material for a lithium secondary battery having improved operational stability and electrochemical properties, and a method of manufacturing the same.

Another object of the present invention to provide a lithium secondary battery including the cathode active material having improved operational stability and electrochemical properties.

To achieve the above objectives, according to an aspect of the present invention, the cathode active material for a lithium secondary battery includes a lithium-transition metal composite oxide particle including a plurality of primary particles, wherein the lithium-transition metal composite oxide particle includes a lithium-boron-containing portion formed between the primary particles.

In some embodiments, the primary particles may have a composition represented by Formula 1 below:

$$Li_aNi_xM_{1-x}O_{2+y} \quad \text{[Formula 1]}$$

(In Formula 1, a, x and y are in a range of $0.9 \leq a \leq 1.2$, $0.5 \leq x \leq 0.99$, and $-0.1 \leq y \leq 0.1$, respectively, and M is at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba or Zr).

In some embodiments, the primary particles may have a hexagonal close-packed structure.

In some embodiments, the lithium-transition metal composite oxide particles may does not have a primary particle having a cubic structure.

In some embodiments, the lithium-boron-containing portion may have an amorphous structure.

In some embodiments, a lithium concentration of the primary particles and a lithium concentration of the lithium-boron-containing portion measured through transmission electron microscope-electron energy loss spectroscopy (TEM-EELS) may be uniform.

In some embodiments, an average boron signal value of the lithium-boron-containing portion measured through the TEM-EELS may be 1.2 to 2.5 times greater than an average boron signal value of the primary particles.

In some embodiments, a total boron content included in the lithium-transition metal composite oxide particle may be 200 to 1,100 ppm based on a weight of the lithium-transition metal composite oxide particle.

In some embodiments, a content of lithium carbonate ($Li_2CO_3$) remaining on the surface of the lithium-transition metal composite oxide particle may be 2,500 ppm or less, and a content of lithium hydroxide (LiOH) remaining on the surface of the lithium-transition metal composite oxide particle may be 2,000 ppm or less.

In addition, according to another aspect of the present invention, there is proved a method of manufacturing a cathode active material for a lithium secondary battery, including: preparing preliminary lithium-transition metal composite oxide particle; mixing the preliminary lithium-transition metal composite oxide particle with a boric acid solution; and performing a heat treatment on the mixed preliminary lithium-transition metal composite oxide particle and the boric acid solution, to prepare a lithium-transition metal composite oxide particle including a plurality of primary particles and a lithium-boron-containing portion formed between the primary particles.

In some embodiments, the heat treatment may be performed at 200 to 400° C. under an oxygen atmosphere.

In some embodiments, the boric acid solution may include a solvent and a boric acid ($H_3BO_3$) powder input into the solvent so that the boric acid solution is saturated.

In some embodiments, an input amount of the boric acid solution may be 3 to 14% by weight based on a total weight of the lithium-transition metal composite oxide particle.

In some embodiments, the preliminary lithium-transition metal composite oxide particle may be mixed with the boric acid solution without water washing treatment.

Further, according to another aspect of the present invention, the lithium secondary battery includes a cathode including a cathode active material layer including the above-described cathode active material for a lithium secondary battery; and an anode disposed to face the cathode.

The cathode active material according to embodiments of the present invention may include a lithium-transition metal composite oxide particle including a plurality of primary particles, and the lithium-transition metal composite oxide particle may include the lithium-boron-containing portion formed between the primary particles. In this case, residual lithium located on the surface of the lithium-transition metal composite oxide particle may react with boron to be converted into the lithium-boron-containing portion, such that initial capacity and battery efficiency properties may be improved.

In some embodiments, a lithium concentration of the primary particle may belong within a predetermined range so as to be substantially the same as or similar to the lithium concentration of the lithium-boron-containing portion. Thereby, lithium ions may smoothly move, and intercalation and deintercalation of the lithium ions may be stably performed, such that initial capacity properties and life-span properties of the battery may be improved.

In some embodiments, by forming the lithium-boron-containing portion having an amorphous structure between the primary particles in the lithium-transition metal composite oxide particle, the surface of the primary particles is protected by the lithium-boron-containing portion, such that the life-span properties and driving stability may be improved.

In the method of manufacturing a cathode active material according to embodiments of the present invention, the preliminary lithium-transition metal composite oxide particle may be mixed with 3 to 14% by weight ('wt. %') of boric acid solution based on a total weight of the lithium-transition metal oxide particle without including a water washing treatment process. In this case, it is possible to prevent the primary particles of the lithium-transition metal composite oxide particle from being deformed from a hexagonal close-packed structure to a cubic structure during water washing treatment. Thereby, it is possible to prevent the initial capacity and life-span properties of the secondary battery from being reduced. In addition, residual lithium located on the surface portion of the lithium-transition metal composite oxide particle and/or between the primary particles is removed, such that a deterioration in the life-span properties due to gas generation may be prevented, and battery resistance may be reduced to improve initial capacity.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Embodiments of the present invention provide a cathode active material and a lithium secondary battery including the same.

Hereinafter, exemplary embodiments of the present invention will be described in detail with reference to the accompanying drawings. However, these embodiments are merely an example, and the present invention is not limited to the specific embodiments described as the example.

In exemplary embodiments, the cathode active material may include a lithium-transition metal composite oxide particle including a plurality of primary particles, and the lithium-transition metal composite oxide particle may include a lithium-boron-containing portion formed between the primary particles.

In some embodiments, the primary particles may have a polycrystalline structure in crystallography.

For example, the primary particles may include nickel (Ni), and may further include at least one of cobalt (Co) and manganese (Mn).

For example, the primary particles may have a composition represented by Formula 1 below:

$$Li_aNi_xM_{1-x}O_{2+y}$$ [Formula 1]

In Formula 1, a, x and y may be in a range of $0.9 \leq a \leq 1.2$, $0.5 \leq x \leq 0.99$, and $-0.1 \leq y \leq 0.1$, respectively. M may denote at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba or Zr.

In some preferred embodiments, a molar ratio or concentration x of Ni in Formula 1 may be 0.8 or more.

For example, when employing a composition of high-nickel (high-Ni) contents in which the x is 0.8 or more, calcination of the lithium-transition metal composite oxide particle may be performed at a relatively low temperature. In this case, an amount of residual lithium generated on the surface of the lithium-transition metal composite oxide particle and/or between the primary particles may be increased. Accordingly, a water washing process or a non-water washing process (e.g., an initial wetting method) for removing the same may be performed. Therefore, when x is 0.8 or more, for example, the above process for removing the residual lithium may be substantially significant.

Ni may be provided as a transition metal associated with the output and capacity of the lithium secondary battery. Therefore, as described above, by employing the composition of high-nickel (high-Ni) contents in the lithium-transition metal composite oxide particles, it is possible to provide a high-power cathode and a high-power lithium secondary battery.

However, as the content of Ni is increased, the long-term storage stability and life-span stability of the cathode or the secondary battery may be relatively deteriorated. However, according to exemplary embodiments, by including Co, the life-span stability and capacity retention properties may be improved through Mn while maintaining electrical conductivity.

In some embodiments, the primary particles may have a hexagonal close-packed structure. Accordingly, many lithium and transition metal elements can be included in a stable layered structure even in a small space, such that the capacity properties and life-span properties of the secondary battery may be improved.

In example embodiments, the lithium-boron-containing portion may have an amorphous structure.

For example, lithium remaining on the surface of the lithium-transition metal composite oxide particle and/or between the primary particles may react with boron contained in a boric acid solution to form the lithium-boron-containing portion having an amorphous structure. In this case, the residual lithium may be converted into a structurally stable lithium-boron containing compound. Accordingly, initial capacity and battery efficiency properties may be improved, and deterioration of life-span properties caused by the residual lithium may be prevented.

In some embodiments, the lithium content of the primary particles may be substantially the same as or similar to the lithium content of the lithium-boron-containing portion.

For example, the lithium concentration of the primary particles and the lithium concentration of the lithium-boron-containing portion, which are measured through transmission electron microscope-electron energy loss spectroscopy (TEM-EELS), may be substantially uniform. For example, the lithium concentration of the primary particles and the lithium concentration of the lithium-boron-containing portion may not exhibit a significant difference in signals measured through TEM-EELS.

In this case, since the lithium content of the primary particles and the lithium content of the lithium-boron-containing portion are substantially the same as or similar to each other, the lithium ions ($Li^+$) may smoothly move. Thereby, intercalation and deintercalation of lithium ions may be stably performed, such that initial capacity properties and life-span properties of the lithium secondary battery may be improved.

For example, the TEM-EELS may detect signals of lithium and boron, which are lightweight elements, by analyzing an image of TEM or high-resolution TEM (HR-TEM) using an EELS detector.

For example, the TEM-EELS may be energy-filtered TEM-EELS (EFTEM-EELS).

In some embodiments, a boron content of the lithium-boron-containing portion may be same as or greater than a boron content of the primary particles.

For example, an average boron signal value of the lithium-boron-containing portion measured through TEM-EELS may be 1.2 to 2.5 times greater than an average boron signal value in the primary particle.

The average boron signal value may be calculated by, for example, mapping signals of the boron element through TEM-EELS (e.g., EFTEM-EELS), then continuously measuring the signals of boron using a jumping ratio mapping method, and averaging the measured signal values.

In above range of a ratio of the average boron signal values, the lithium-boron-containing portion having an amorphous structure may be sufficiently formed between the primary particles included in the lithium-transition metal composite oxide particle. Accordingly, the surface of the primary particles may be protected by the lithium-boron-containing portion, such that the life-span properties of the secondary battery may be improved. In addition, since residual lithium impurities on the surface of the lithium-transition metal composite oxide particle has been sufficiently removed, electrochemical properties of the secondary battery may be improved in this state.

In some embodiments, a total boron content included in the above-described lithium-transition metal composite oxide particle may be 200 to 1,100 ppm based on a weight of the lithium-transition metal composite oxide particle. In this case, deterioration in battery properties due to excessive doping or coating may be prevented, while enough boron to implement the above-described effects is included therein.

In some embodiments, the content of the lithium precursor remaining on the surface of the lithium-transition metal composite oxide particle may be controlled.

In some embodiments, a content of lithium carbonate ($Li_2CO_3$) remaining on the surface of the lithium-transition metal composite oxide particle may be 2,500 ppm or less, and a content of lithium hydroxide (LiOH) remaining on the surface of the lithium-transition metal composite oxide particle may be 2,000 ppm or less.

In above range of the contents of lithium carbonate and lithium hydroxide, a resistance may be decreased during lithium ion movement, such that the initial capacity properties and output properties of the lithium secondary battery may be improved, and life-span properties during repeated charging and discharging may be enhanced.

Figure 1:
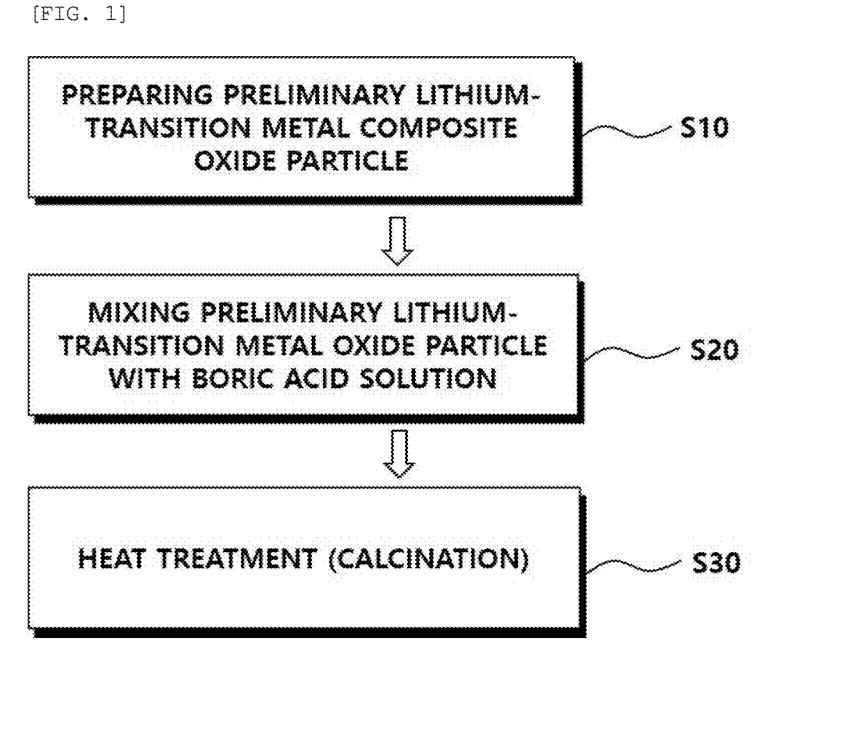
FIG. 1 is a process flow chart illustrating a method of manufacturing a cathode active material according to exemplary embodiments.

FIG. 1 is a process flow chart illustrating a method of manufacturing a cathode active material according to exemplary embodiments.

Hereinafter, description of the method of manufacturing the cathode active material for a lithium secondary battery according to exemplary embodiments described above will be provided with reference to FIG. 1.

Referring to FIG. 1, a preliminary lithium-transition metal composite oxide particle may be prepared (e.g., step S10).

For example, the preliminary lithium-transition metal composite oxide particle may be prepared by reacting a transition metal precursor with a lithium precursor. The transition metal precursor (e.g., Ni—Co—Mn precursor) may be prepared through a co-precipitation reaction.

For example, the transition metal precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare the transition metal precursor.

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

The temperature of the co-precipitation reaction may be controlled, for example, in a range of about 40° C. to 60° C. The reaction time may be controlled in a range of about 24 to 72 hours.

The lithium precursor compound may include, for example, lithium carbonate, lithium nitrate, lithium acetate, lithium oxide, lithium hydroxide and the like. These compounds may be used alone or in combination of two or more thereof.

In exemplary embodiments, the boric acid solution may be input into the preliminary lithium-transition metal composite oxide particle and mixed (e.g., step S20).

In some embodiments, the boric acid solution may include boric acid ($H_3BO_3$) powder input into the solvent so that the boric acid solution is saturated. For example, the preliminary lithium-transition metal composite oxide particle may be mixed with the boric acid solution. In this case, boron contained in the boric acid solution may react with residual lithium present on the surface of the lithium-transition metal composite oxide particle and/or between the primary particles to form the lithium-boron-containing portion. Accordingly, it is possible to obtain a lithium-transition metal composite oxide particle including the primary particles and the lithium-boron-containing portion.

For example, impurities present on the surface of the preliminary lithium-transition metal composite oxide particle may be removed through the mixing process. For example, in order to improve a yield of the lithium-transition metal oxide particle or stabilize a synthesis process, the lithium precursor (lithium salt) may be used in an excess amount. In this case, a lithium precursor including lithium hydroxide (LiOH) and lithium carbonate ($Li_2CO_3$) may remain on the surface of the preliminary lithium-transition metal composite oxide particles.

In addition, for example, as the lithium-transition metal composite oxide particle contains the composition of higher-Ni contents, calcination may be performed at a lower temperature when manufacturing the cathode. In this case, a content of residual lithium on the surface of the lithium-transition metal composite oxide particle and/or between the primary particles may be increased.

When the residual lithium is removed by washing with water (water washing treatment) in substantially the same amount as the cathode active material, the residual lithium may be removed, but oxidation of the surface of the preliminary lithium-transition metal composite oxide particle and side reactions with water may be caused, thereby resulting in a damage or collapse of the layered structure of the primary particles. In addition, as the layered structure is deformed into the cubic structure, spinel structure and/or rock salt structure rather than the hexagonal close-packed structure by water, the lithium-nickel-based oxide may be hydrolyzed to form nickel impurities such as NiO or $Ni(OH)_2$.

However, according to exemplary embodiments of the present invention, since the mixing process (e.g., the initial wetting method) is performed using the boric acid solution without water washing treatment, passivation due to the boron may be implemented on the surface of the lithium-transition metal composite oxide particle while the mixing process is performed. For example, the lithium-boron-containing portion having an amorphous structure in which lithium and boron are bonded may be formed between primary particles having the hexagonal close-packed structure.

The term "initial wetting method" as used herein may refer to, for example, a method of inputting 3 to 14 wt. % of water or the boric acid solution by, for instance, a spray method, based on a total weight of the lithium-transition metal composite oxide particle without performing water washing treatment of inputting water in an amount substantially the same as or similar to the total weight of the lithium-transition metal composite oxide particle and stirring.

In addition, since water washing treatment is not performed, for example, lithium-transition metal composite oxide particle may not include a primary particle having the cubic structure. Therefore, the residual lithium may be effectively removed while preventing oxidation and damage to the layered structure due to water on the particle surface.

For example, when using boric acid powder instead of the boric acid solution, since the boric acid powder does not have a capillary force, it cannot penetrate between the primary particles, and most of the boric acid powder may react with the residual lithium present on the surface of the secondary particles in which the primary particles are aggregated. For example, the lithium-boron-containing portion may be formed in the form of being coated on the surface of secondary particles. In this case, the surface of the primary particles may not be sufficiently protected when impregnating the electrolyte, and the residual lithium may remain on the surface between the primary particles, thereby causing an increase in the battery resistance. Accordingly, the capacity and output properties of the battery may be reduced.

According to exemplary embodiments of the present invention, the initial wetting method may be performed using the boric acid solution as described above. In this case, the boric acid solution may permeate between the primary particles by the capillary force and react with the residual lithium between the primary particles to form the lithium-boron-containing portion between the primary particles.

For example, since the lithium-boron-containing portion has the amorphous structure, ion conductivity may be excellent, and thus battery resistance may not be increased. Accordingly, it is possible to prevent deterioration in the capacity properties while improving the life-span properties of the battery.

In some embodiments, an input amount of the boric acid solution may be 3 to 14 wt. % based on the total weight of the lithium-transition metal composite oxide particle. In this case, while the lithium-boron-containing portion is also formed to have an appropriate lithium/boron content at a position where the residual lithium was present between the primary particles and/or the surface portion of the lithium-transition metal composite oxide particle. Further, it is possible to prevent a damage or collapse of the layered structure of the primary particles from being caused.

After the mixing process, for example, in step S30, a cathode active material including the primary particles and the lithium-boron-containing portion may be obtained through a heat treatment (calcination) process.

For example, the preliminary lithium-transition metal composite oxide particles and the lithium-boron-containing portion on which the mixing process has been performed may be subjected to heat treatment using a calcination furnace. Accordingly, it is possible to obtain lithium-transition metal composite oxide particle in which the lithium-boron-containing portion is fixed between the primary particles.

For example, the heat treatment may be performed at 200 to 400° C. under an oxygen atmosphere. In this case, the preliminary lithium-transition metal composite oxide particle and boron in the boric acid solution may be sufficiently bonded to form the lithium-boron-containing portion.

Figure 2:
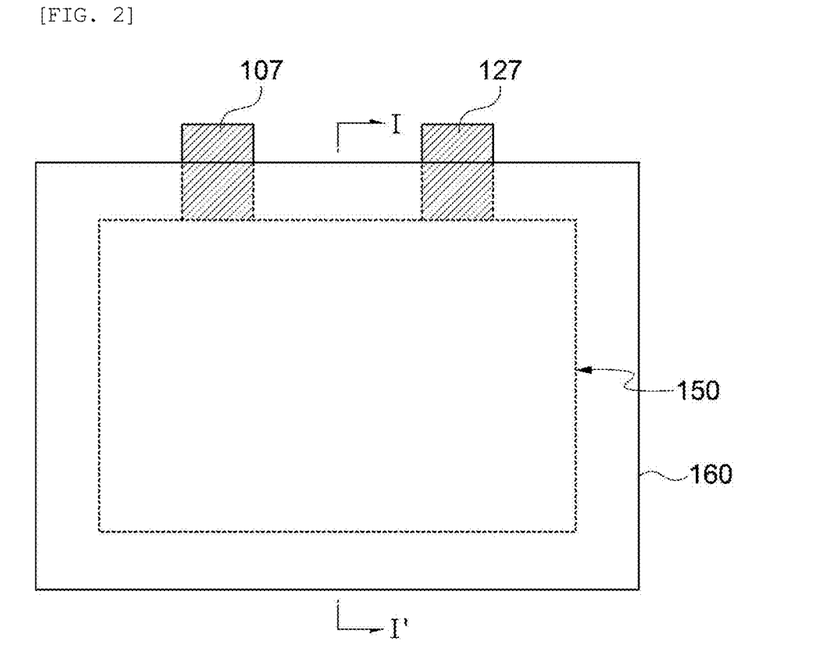
FIGS. 2 and 3 are a schematic plan view and a cross-sectional view of a lithium secondary battery according to exemplary embodiments, respectively.
Figure 3:
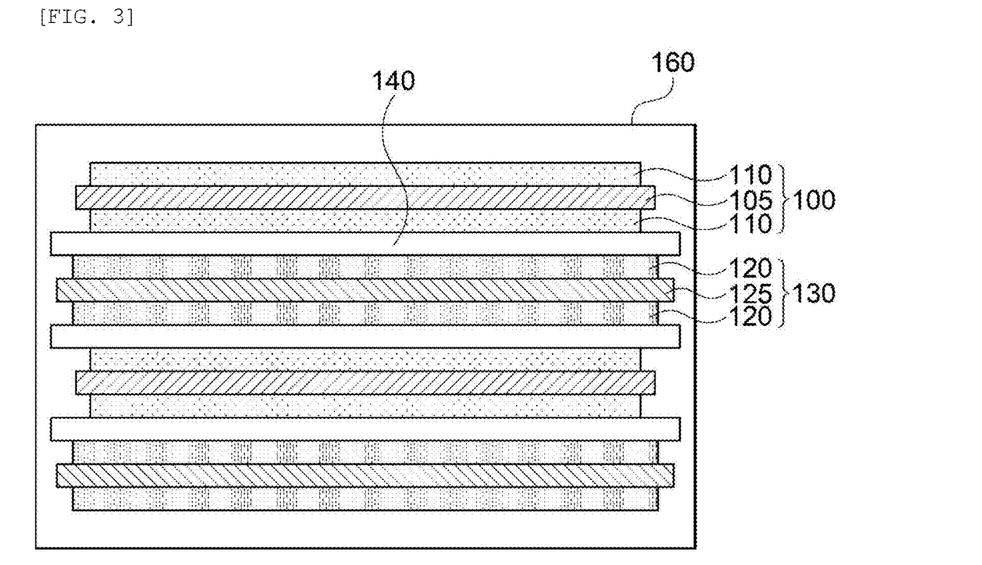

FIGS. 2 and 3 are a schematic plan view and a cross-sectional view of a lithium secondary battery according to exemplary embodiments, respectively.

Hereinafter, description of a lithium secondary battery including a cathode including the above-described cathode active material for a lithium secondary battery will be provided with reference to FIGS. 2 and 3.

Referring to FIGS. 2 and 3, the lithium secondary battery may include a cathode 100, an anode 130, and a separation membrane 140 including the cathode active material which includes the above-described lithium-boron-containing portion.

The cathode 100 may include a cathode active material layer 110 formed by applying the above-described cathode active material including the lithium-transition metal oxide particles to a cathode current collector 105.

For example, a slurry may be prepared by mixing and stirring the preliminary lithium-transition metal oxide particles mixed with boron compound powder with a binder, a conductive material and/or a dispersant in a solvent. The cathode current collector 105 may be coated with the slurry, followed by compressing and drying to prepare the cathode.

The cathode current collector 105 may include, for example, stainless steel, nickel, aluminum, titanium, copper, or an alloy thereof, and preferably includes aluminum or an aluminum alloy.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as the binder for forming the cathode. In this case, an amount of the binder for forming the cathode active material layer 110 may be reduced and an amount of the cathode active material may be relatively increased, thereby improving the output and capacity of the secondary battery.

The conductive material may be included to facilitate electron movement between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB), mesophase pitch-based carbon fiber (MPCF) or the like. Examples of the crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 125 may include gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent. The anode current collector may be coated with the slurry, followed by compressing and drying to prepare the anode 130.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having high melting point, polyethylene terephthalate fiber or the like.

According to exemplary embodiments, an electrode cell is defined by the cathode 100, the anode 130, and the separation membrane 140, and a plurality of the electrode cells may be stacked to form a jelly roll type electrode assembly 150, for example. For example, the electrode assembly 150 may be formed by winding, lamination, folding, or the like of the separation membrane 140.

The electrode assembly may be housed in an outer case 160 together with the electrolyte, such that a lithium secondary battery may be defined. According to exemplary embodiments, a non-aqueous electrolyte may be used as the electrolyte.

The non-aqueous electrolyte includes a lithium salt as an electrolyte and an organic solvent. The lithium salt is represented by, for example, $Li^+X^-$ and may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like as an example.

Examples of the organic solvent may use any one of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane and the like. These compounds may be used alone or in combination of two or more thereof.

As shown in FIG. 3, electrode tabs (a cathode tab and an anode tab) may protrude from the cathode current collector 105 and the anode current collector 125, respectively, which belong to each electrode cell, and may extend to one side of the outer case 160. The electrode tabs may be fused together with the one side of the outer case 160 to form electrode leads (a cathode lead 107 and an anode lead 127) extending or exposed to an outside of the outer case 160.

The lithium secondary battery may be manufactured, for example, in a cylindrical shape using a can, a prismatic shape, a pouch type, or a coin type.

According to exemplary embodiments, a lithium secondary battery having improved life-span and long-term stability while suppressing a decrease in capacity and average voltage by improving chemical stability of the cathode active material by doping or coating with boron may be implemented.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

Example 1

(1) Preparation of the Preliminary Lithium-Transition Metal Composite Oxide Particle (S10)

$NiSO_4$, $CoSO_4$ and $MnSO_4$ were mixed in a ratio of 0.8:0.1:0.1, respectively, using distilled water from which internal dissolved oxygen is removed by bubbling with $N_2$ for 24 hours. The solution was input into a reactor at 50° C., and a co-precipitation reaction was performed for 48 hours using NaOH and $NH_3H_2O$ as a precipitant and a chelating agent to obtain $Ni_{0.8}Co_{0.1}Mn_{0.1}(OH)_2$ as a transition metal precursor. The obtained precursor was dried at 80° C. for 12 hours, and then again dried at 110° C. for 12 hours.

Lithium hydroxide and the transition metal precursor were added to a dry high-speed mixer in a ratio of 1.01:1, and the mixture was uniformly mixed for 5 minutes. The mixture was put into a calcination furnace, and heated to 730 to 750° C. at a heating rate of 2° C./min, then maintained at 730 to 750° C. for 10 hours. Oxygen was passed continuously at a flow rate of 10 mL/min during heating and maintenance. After completion of the calcination, the mixture was naturally cooled to room temperature, followed by grinding and classification to prepare the preliminary lithium-transition metal composite oxide particles in the form of primary particles of the cathode active material $LiNi_{0.88}Co_{0.1}Mn_{0.1}O_2$.

(2) Preparation and Mixing of Boric Acid Solution (S20), and the Heat Treatment (S30)

Boric acid ($H_3BO_3$) powder was input into de-ionized water (DIW) in an amount of 4.7 wt. % based on the weight of de-ionized water, and then the mixture was stirred so that the boric acid powder was sufficiently dissolved in the de-ionized water to prepare a boric acid solution.

The boric acid solution was input into the obtained preliminary lithium-transition metal composite oxide particles in an amount of 5.2 wt. % based on the total weight of the lithium-transition metal composite oxide particles and mixed.

The mixture was put into the calcination furnace, heated to a temperature between 20° and 300° C. at a heating rate of 2° C./min while supplying oxygen at a flow rate of 10 mL/min, and maintained at the heated temperature for 10 hours. After completion of the calcination, the calcined product was classified by 325 mesh to obtain a cathode active material.

(3) Manufacture of Lithium Secondary Battery

A secondary battery was manufactured using the above-described cathode active material. Specifically, the cathode active material, Denka Black as a conductive material, and PVDF as a binder were mixed in a mass ratio composition of 93:5:2, respectively, to prepare a cathode slurry. Then, the slurry was applied to an aluminum current collector, followed by drying and pressing the same to prepare a cathode. After the press, a target electrode density of the cathode was adjusted to 3.0 g/cc.

Lithium metal was used as an anode active material.

The cathode and anode prepared as described above were notched in a circular shape having a diameter of Ø14 and Ø16, respectively, and laminated, then an electrode cell was prepared by disposing a separation membrane (polyethylene, thickness: 13 μm) notched to Ø19 between the cathode and the anode. The prepared electrode cell was put into a coin cell outer case having a specification of a diameter of 20 mm and a height of 1.6 mm, then an electrolyte was injected and assembled, followed by aging for 12 hours or more so that the electrolyte could be impregnated inside the electrodes.

The electrolyte used herein was prepared by dissolving 1M $LiPF_6$ solution in a mixed solvent of EC/EMC (30/70; volume ratio).

The secondary battery manufactured as described above was subjected to formation charging-discharging (charge condition: CC-CV 0.1 C 4.3 V 0.005 C CUT-OFF, discharge condition: CC 0.1 C 3 V CUT-OFF).

Example 2

A cathode active material and a lithium secondary battery were obtained according to the same procedures as described in Example 1, except that the boric acid solution was input in an amount of 10.5 wt. % based on the total weight of the lithium-transition metal composite oxide particles and mixed.

Example 3

A cathode active material and a lithium secondary battery were obtained according to the same procedures as described in Example 1, except that the boric acid solution was input in an amount of 13.6 wt. % based on the total weight of the lithium-transition metal composite oxide particles and mixed.

Example 4

A cathode active material and a lithium secondary battery were obtained according to the same procedures as described in Example 1, except that the boric acid solution was input in an amount of 2.6 wt. % based on the total weight of the lithium-transition metal composite oxide particles and mixed.

Example 5

A cathode active material and a lithium secondary battery were obtained according to the same procedures as described in Example 1, except that the boric acid solution was input in an amount of 15.7 wt. % based on the total weight of the lithium-transition metal composite oxide particles and mixed.

Comparative Example 1

A cathode active material and a lithium secondary battery were obtained according to the same procedures as described in Example 1 except that, without performing the step of mixing the preliminary lithium-transition metal composite oxide particles with the boric acid solution, the preliminary lithium-transition metal composite oxide particles were input into 100 wt. % of de-ionized water based on the total weight of the preliminary lithium-transition metal composite oxide particles, and the mixture was subjected to water washing treatment by stirring for 10 minutes, followed by drying at 130 to 170° C. under vacuum for 12 hours after filtering.

Comparative Example 2

A cathode active material and a lithium secondary battery were obtained according to the same procedures as described in Example 1, except that de-ionized water was input in an amount of 5 wt. % based on the total weight of the lithium-transition metal composite oxide particles instead of the boric acid solution and mixed.

The above-described examples and Comparative Example 2 were performed by an initial wetting method in which a small amount of solution or water was input, not the water washing treatment in which substantially the same amount of water as the cathode active material was input, and in Comparative Example 1, the water washing treatment was performed.

Experimental Example 1

(1) High-Resolution Transmission Electron Microscopy (HR-TEM) and Fast Fourier Transform (FFT) Image Analysis Through HR-TEM analysis and FFT image analysis on cross-sections of the lithium-transition metal composite oxide particles obtained according to the above-described examples and comparative examples, the structure of the compound present in the primary particle region and the lithium-boron-containing portion (a region between the primary particles) was analyzed.

(2) Calculation of Average Boron Signal Value

The lithium-transition metal composite oxide particles obtained according to the above-described examples and comparative examples were continuously measured to obtain signals for lithium and boron by mapping the signals of lithium and boron in the primary particle region and the lithium-boron-containing portion through EFTEM-EELS, and using a jumping ratio mapping method in each region.

Thereafter, by averaging the signal values for boron measured for each of the primary particle region and the lithium-boron-containing portion, an average boron signal value was calculated.

(3) Measurement of Boron Content

The cathode active material, hydrochloric acid and hydrogen peroxide were input into a vial or PP tube, and the mixture was first dissolved by shaking to obtain a sample. The obtained sample was sufficiently dissolved by heating to remove chlorine gas. Thereafter, the sample was cooled to room temperature, diluted with ultra de-ionized water, and the boron content in the cathode active material was analyzed in a ppm (mg/kg) unit using an ICP-OES (Model: Optima 8300) device.

Process methods, input amounts of boric acid solution, boron content, and average boron signal values for each region of the examples and comparative examples are shown in Table 1 below.

TABLE 1

| Section | Process method | Input amount of boric acid solution (de-ionized water in comparative examples) (wt. %) | Boron content (ppm) | Average boron signal value of primary particles (counts) | Average boron signal value of lithium-boron-containing portions (counts) | Signal ratio |
|---|---|---|---|---|---|---|
| Example 1 | Initial wetting | 5.2 | 411 | 0.803 | 1.281 | 1.60 |
| Example 2 | Initial wetting | 10.5 | 819 | 0.812 | 1.647 | 2.03 |
| Example 3 | Initial wetting | 13.6 | 1060 | 0.829 | 1.903 | 2.30 |
| Example 4 | Initial wetting | 2.6 | 192 | 0.817 | 0.971 | 1.19 |
| Example 5 | Initial wetting | 15.7 | 1209 | 0.821 | 2.116 | 2.58 |
| Comparative Example 1 | Water washing treatment | 100 | 0 | 0.806 | 0.795 | 0.99 |
| Comparative Example 2 | Initial wetting | 5 | 0 | 0.813 | 0.805 | 0.99 |

Figure 4A:
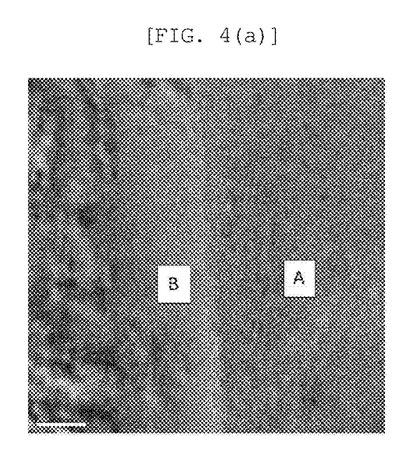
FIGS. 4(a) and 4(b) are high-resolution transmission electron microscopy (HR-TEM) images of lithium-transition metal composite oxide particles according to exemplary embodiments.
Figure 4B:
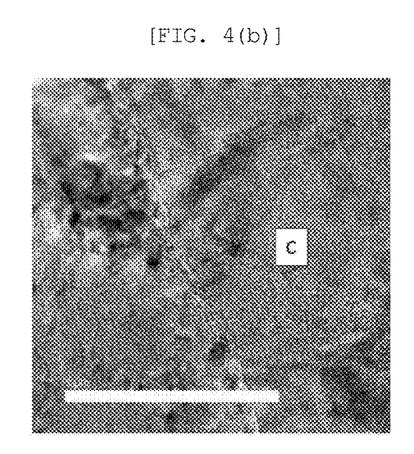

FIGS. 4(a) and 4(b) are HR-TEM images of the lithium-transition metal composite oxide particles according to Example 1 and Comparative Example 1. Specifically, FIG. 4(a) is an HR-TEM image of the lithium-transition metal composite oxide particles of Example 1, and FIG. 4(b) is an HR-TEM image of the lithium-transition metal composite oxide particles of Comparative Example 1.

Figure 5A:
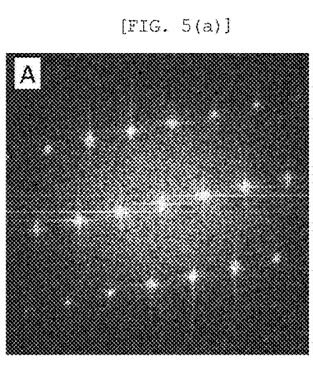
FIGS. 5(a)-5(c) are fast Fourier transform (FFT) images in regions A, B and C of FIG. 4.
Figure 5B:
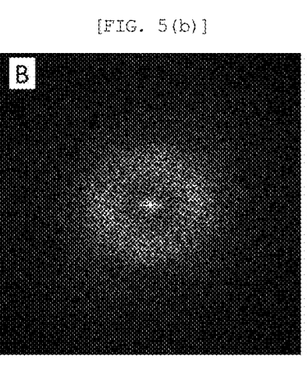
Figure 5C:
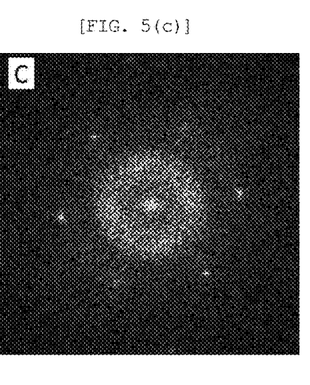

FIGS. 5(a)-5(c) are FFT images in regions A, B and C in FIGS. 4(a) and 4(b). Specifically, FIG. 5(a) is an enlarged FFT image of region A in FIG. 4(a), FIG. 5(b) is an enlarged FFT image of region B in FIG. 4(a), and FIG. 5(c) is an enlarged FFT image of region C in FIG. 4(b).

Referring to FIGS. 4(a)-4(b) and 5(a)-5(c), in the case of Comparative Example 1, since the water washing process was performed instead of the initial wetting method, the layered structure of the primary particle region (e.g., the region C in FIG. 4(b)) was deformed into a cubic structure from the hexagonal close-packed structure as shown in FIG. 5(c).

On the other hand, in the case of Example 1 in which the mixing process (e.g., initial wetting method) was performed by using the boric acid solution, the structure of the primary particles in the primary particle region (e.g., the region A in FIG. 4(a)) was maintained in the hexagonal close-packed structure as shown in FIG. 6, and the cathode active material including an amorphous structure was generated in a region between the primary particles (e.g., the region B in FIG. 4(a)).

Figure 6A:
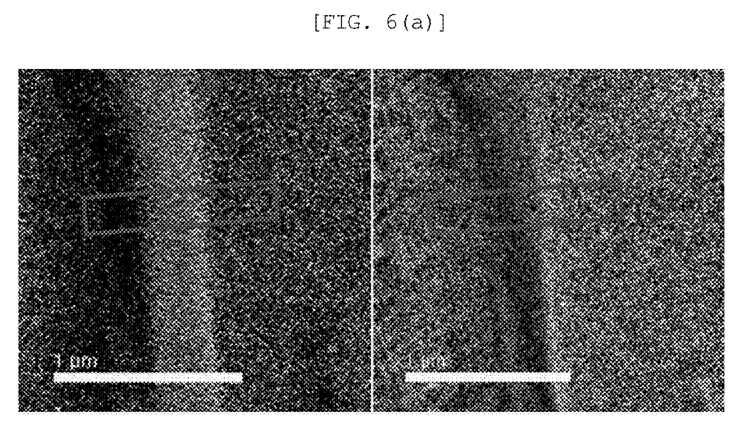
FIGS. 6(a) and 6(b) are mapping images of microelements obtained using transmission electron microscope-electron energy loss spectroscopy (TEM-EELS) on the lithium-transition metal composite oxide particles according to exemplary embodiments.
Figure 6B:
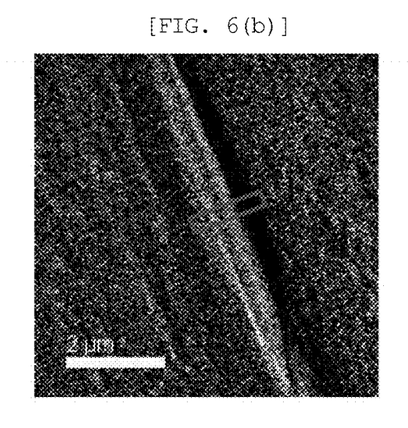

FIGS. 6(a) and 6(b) are mapping images of microelements obtained using EFTEM-EELS on the lithium-transition metal composite oxide particles according to Examples 1 and 5. Specifically, FIG. 6(a) is mapping images of boron and lithium obtained using EFTEM-EELS on the lithium-transition metal composite oxide particles according to Example 1, and FIG. 6(b) is a mapping image of boron obtained using EFTEM-EELS on the lithium-transition metal composite oxide particles according to Example 5.

Figure 7:
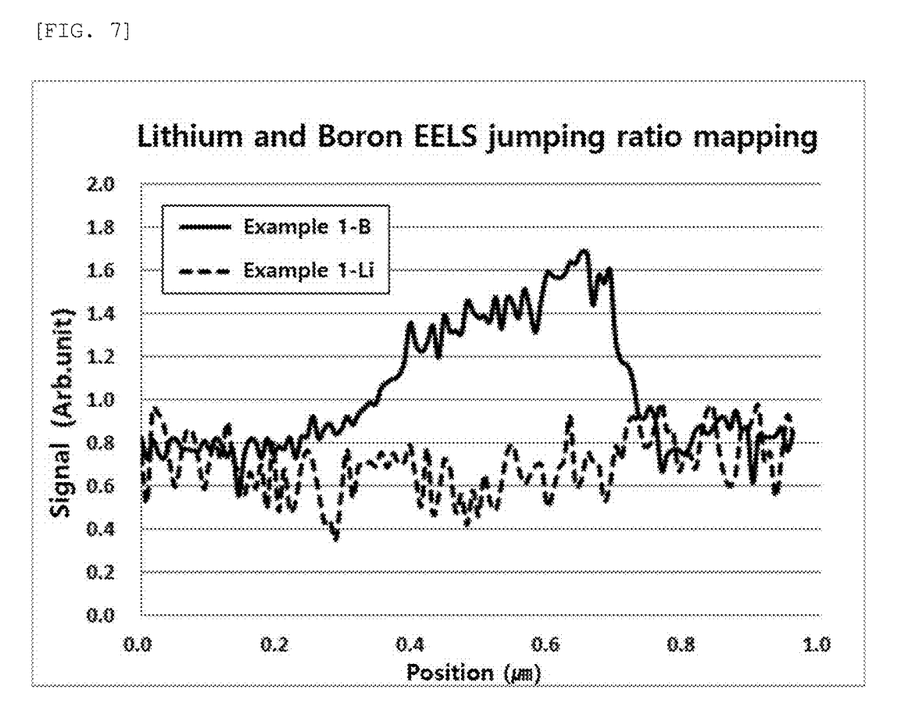
FIG. 7 is a graph illustrating distribution of lithium and boron EELS signal values of the lithium-transition metal composite oxide particles according to exemplary embodiments.

FIG. 7 is a graph illustrating distribution of lithium and boron EELS signal values of the lithium-transition metal composite oxide particles according to Example 1.

Referring to FIG. 7, in the case of lithium according to Example 1, it was confirmed that there was no difference in the EELS signal values between the primary particle region and the lithium-boron-containing portion. On the other hand, in the case of boron, it was confirmed that there was a significant difference in the signal values between the primary particle region and the lithium-boron-containing portion.

Figure 8:
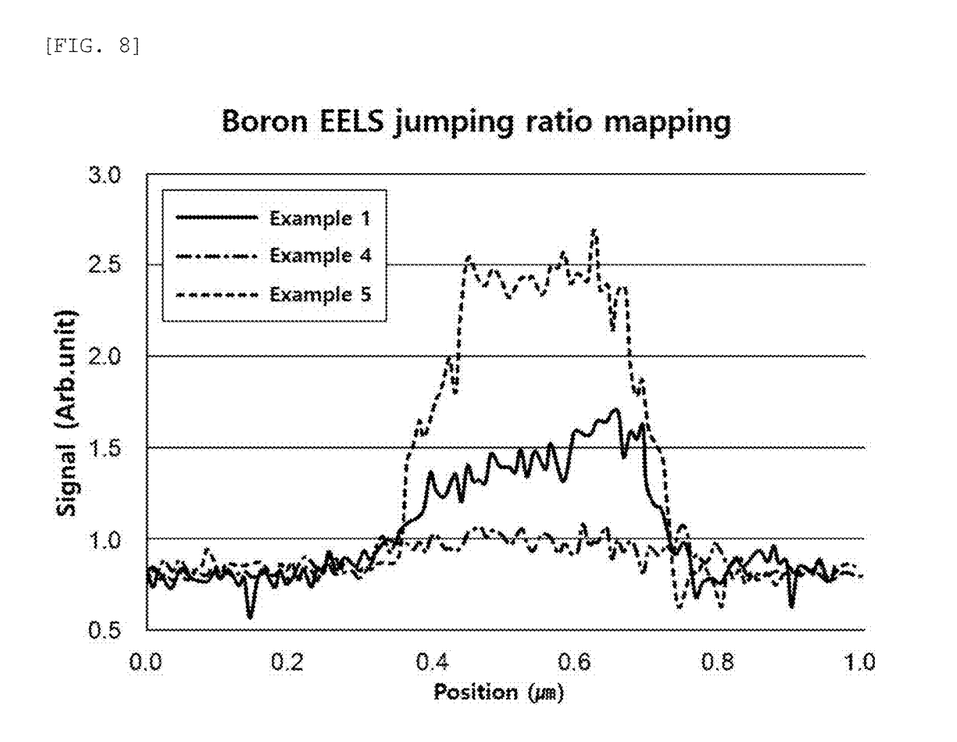
FIG. 8 is a graph illustrating distribution of boron EELS signal values of the lithium-transition metal composite oxide particles according to exemplary embodiments.

FIG. 8 is a graph illustrating distribution of boron EELS signal values of the lithium-transition metal composite oxide particles according to Examples 1, 4 and 5.

the Wader's method to measure $Li_2CO_3$ and LiOH contents in the solution.

(4) Measurement of Initial Charge/Discharge Capacity and Evaluation of Initial Capacity Efficiency After charging (CC-CV 0.1 C 4.3 V 0.005 C CUT-OFF) the lithium secondary batteries manufactured according to the above-described examples and comparative examples in a chamber at 25° C., battery capacities (initial charge capacities) were measured, and after discharging again (CC 0.1 C 3.0 V CUT-OFF) the same, the battery capacities (initial discharge capacities) were measured.

Initial capacity efficiency of each lithium secondary battery was calculated by dividing the measured initial discharge capacity by the measured initial charge capacity, then converting it into a percentage (%).

(5) Evaluation of Rate Characteristic

Charging (CC/CV 0.1 C 4.3 V 0.005 C CUT-OFF) and discharging (CC 0.1 C 3.0 V CUT-OFF) were performed one time on the battery cells according to the examples and comparative examples, then charging (CC/CV 0.5 C 4.3 V 0.005 C CUT-OFF) and discharging (CC 4.0 C 3.0 V CUT-OFF) were performed once again for evaluating rate properties. The rate characteristic was evaluated by dividing the 4.0 C discharge capacity by the 0.1 C discharge capacity, then converting it into a percentage (%).

(6) Measurement of Capacity Retention Rate (Life-Time (Cycle) Properties) During Repeated Charging and Discharging The lithium secondary batteries according to the examples and comparative examples were repeatedly charged (CC/CV 0.5 C 4.3 V 0.05 C CUT-OFF) and discharged (CC 1.0 C 3.0 V CUT-OFF) 300 times, then the capacity retention rate was evaluated as a percentage of the discharge capacity at 300 times divided by the discharge capacity at one time.

The evaluation results are shown in Table 2 below.

TABLE 2

| Section | $Li_2CO_3$ content (ppm) | LiOH content (ppm) | Initial charge capacity (mAh/g) | Initial discharge capacity (mAh/g) | Initial capacity efficiency (%) | Rate characteristic (%) | Capacity retention rate (%) |
| --- | --- | --- | --- | --- | --- | --- | --- |
| Example 1 | 2100 | 1410 | 239.9 | 213.8 | 89.1% | 85.2% | 75 |
| Example 2 | 2050 | 1220 | 239.6 | 213.9 | 89.3% | 85.4% | 75 |
| Example 3 | 2420 | 1570 | 239.1 | 213.8 | 89.4% | 84.9% | 74 |
| Example 4 | 2690 | 2650 | 238.8 | 212.2 | 88.9% | 84.9% | 69 |
| Example 5 | 3070 | 2640 | 237.9 | 210.9 | 88.3% | 84.5% | 74 |
| Comparative Example 1 | 1730 | 1390 | 237.1 | 209.0 | 88.1% | 86.0% | 49 |
| Comparative Example 2 | 3010 | 2730 | 238.3 | 212.1 | 89.0% | 85.0% | 64 |

Referring to FIG. 8, it can be confirmed that the boron signal value in the lithium-boron-containing portion varies depending on the input amount of the mixed boric acid solution.

Experimental Example 2

(3) Measurement of Residual Lithium ($Li_2CO_3$, LiOH) Content 1.5 g of each of the cathode active materials of the examples and comparative examples was quantified in a 250 mL flask, 100 g of deionized water was input then a magnetic bar was put thereto, and the mixture was stirred at a speed of 60 rpm for 10 minutes. Thereafter, 100 g was sampled after filtering using a flask at reduced pressure. The sampled solution was put into a container of automatic titrator and automatically titrated with 0.1N HCl referring to Referring to Table 2, in the case of the examples in which the initial wetting method was performed by mixing the boric acid solution, the content of lithium remaining on the surface of the lithium-transition metal composite oxide particles was reduced compared to the comparative examples as a whole, and good initial capacity efficiency and excellent life-span properties were secured.

However, in the case of Example 4 in which the boric acid powder was input in an amount of less than 3 wt. %, since the boron to react with the residual lithium was not enough, the residual lithium was slightly increased and the life-span characteristic was slightly reduced compared to Examples 1 to 3.

In addition, in the case of Example 5, in which the boric acid solution was input exceeding 14 wt. %, it was confirmed that the life-span characteristic was maintained, but due to the excess solution, results similar to some water washing treatments were caused, and the residual lithium was slightly increased compared to Examples 1 to 3, and the discharge capacity and efficiency were also reduced.

In addition, in the case of Examples 1 to 3 in which a ratio of the average boron signal values in the primary particles and the lithium-boron-containing portion satisfies a predetermined range (1.2 to 2.5 times), the residual lithium was reduced as a whole and good life-span characteristic was secured compared to Examples 4 and 5, and the comparative examples having a ratio thereof out of the above range.

In the case of Comparative Example 1 using the conventional water washing method, the residual lithium was removed to a large level, but as the layered structure of the primary particles was deformed during the water washing treatment, all the initial capacity, efficiency, life-span and electrochemical properties were greatly reduced.

DESCRIPTION OF REFERENCE NUMERALS

100: Cathode
105: Cathode current collector
107: Cathode lead
110: Cathode active material layer
120: Anode active material layer
125: Anode current collector
127: Anode lead
130: Anode
140: Separation membrane
150: Electrode assembly

What is claimed is:

1. A cathode active material for a lithium secondary battery comprising:
a lithium-transition metal composite oxide particle comprising a plurality of primary particles,
wherein the lithium-transition metal composite oxide particle comprises a lithium-boron-containing portion formed between the primary particles, and
wherein an average boron signal value of the lithium-boron-containing portion measured through the TEM-EELS is 1.2 to 2.5 times greater than an average boron signal value of the primary particles.

2. The cathode active material for a lithium secondary battery according to claim 1, wherein the primary particles have a composition represented by Formula 1 below:

[Formula 1]

(In Formula 1, a, x and y are in a range of 0.9≤a≤1.2, 0.5≤x≤0.99, and −0.1≤y≤0.1, respectively, and M is at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba or Zr).

3. The cathode active material for a lithium secondary battery according to claim 1, wherein the primary particles have a hexagonal close-packed structure.

4. The cathode active material for a lithium secondary battery according to claim 3, wherein the lithium-transition metal composite oxide particle does not have a primary particle having a cubic structure.

5. The cathode active material for a lithium secondary battery according to claim 1, wherein the lithium-boron-containing portion has an amorphous structure.

6. The cathode active material for a lithium secondary battery according to claim 1, wherein a lithium concentration of the primary particles and a lithium concentration of the lithium-boron-containing portion measured through transmission electron microscope-electron energy loss spectroscopy (TEM-EELS) are uniform.

7. The cathode active material for a lithium secondary battery according to claim 1, wherein a total boron content comprised in the lithium-transition metal composite oxide particle is 200 to 1,100 ppm based on a weight of the lithium-transition metal composite oxide particle.

8. The cathode active material for a lithium secondary battery according to claim 1, wherein a content of lithium carbonate ($Li_2CO_3$) remaining on the surface of the lithium-transition metal composite oxide particle is 2,500 ppm or less, and a content of lithium hydroxide (LiOH) remaining on the surface of the lithium-transition metal composite oxide particle is 2,000 ppm or less.

9. A method of manufacturing the cathode active material for a lithium secondary battery according to claim 1, the method comprising:
preparing preliminary lithium-transition metal composite oxide particle;
mixing the preliminary lithium-transition metal composite oxide particle with a boric acid solution; and
performing a heat treatment on the mixed preliminary lithium-transition metal composite oxide particle and the boric acid solution, to prepare a lithium-transition metal composite oxide particle comprising a plurality of primary particles and a lithium-boron-containing portion formed between the primary particles.

10. The method of manufacturing a cathode active material for a lithium secondary battery according to claim 9, wherein the heat treatment is performed at 200 to 400° C. under an oxygen atmosphere.

11. The method of manufacturing a cathode active material for a lithium secondary battery according to claim 9, wherein the boric acid solution comprises a solvent and a boric acid ($H_3BO_3$) powder input into the solvent so that the boric acid solution is saturated.

12. The method of manufacturing a cathode active material for a lithium secondary battery according to claim 9, wherein an input amount of the boric acid solution is 3 to 14% by weight based on a total weight of the lithium-transition metal composite oxide particle.

13. The method of manufacturing a cathode active material for a lithium secondary battery according to claim 9, wherein the preliminary lithium-transition metal composite oxide particle is mixed with the boric acid solution without water washing treatment.

14. A lithium secondary battery comprising:
a cathode comprising a cathode active material layer comprising the cathode active material for a lithium secondary battery according to claim 1; and
an anode disposed to face the cathode.

* * * * *